Patented Jan. 15, 1924.

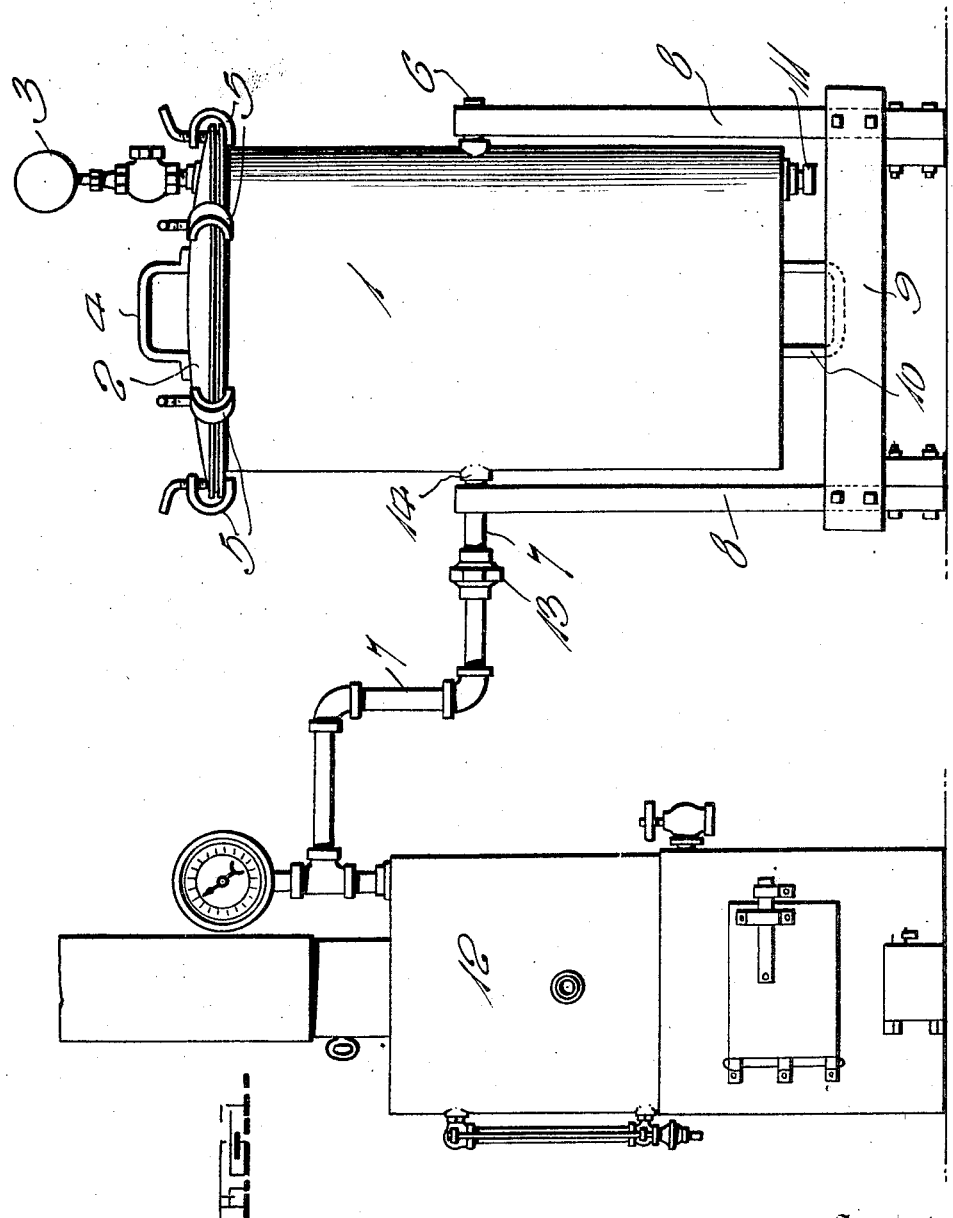

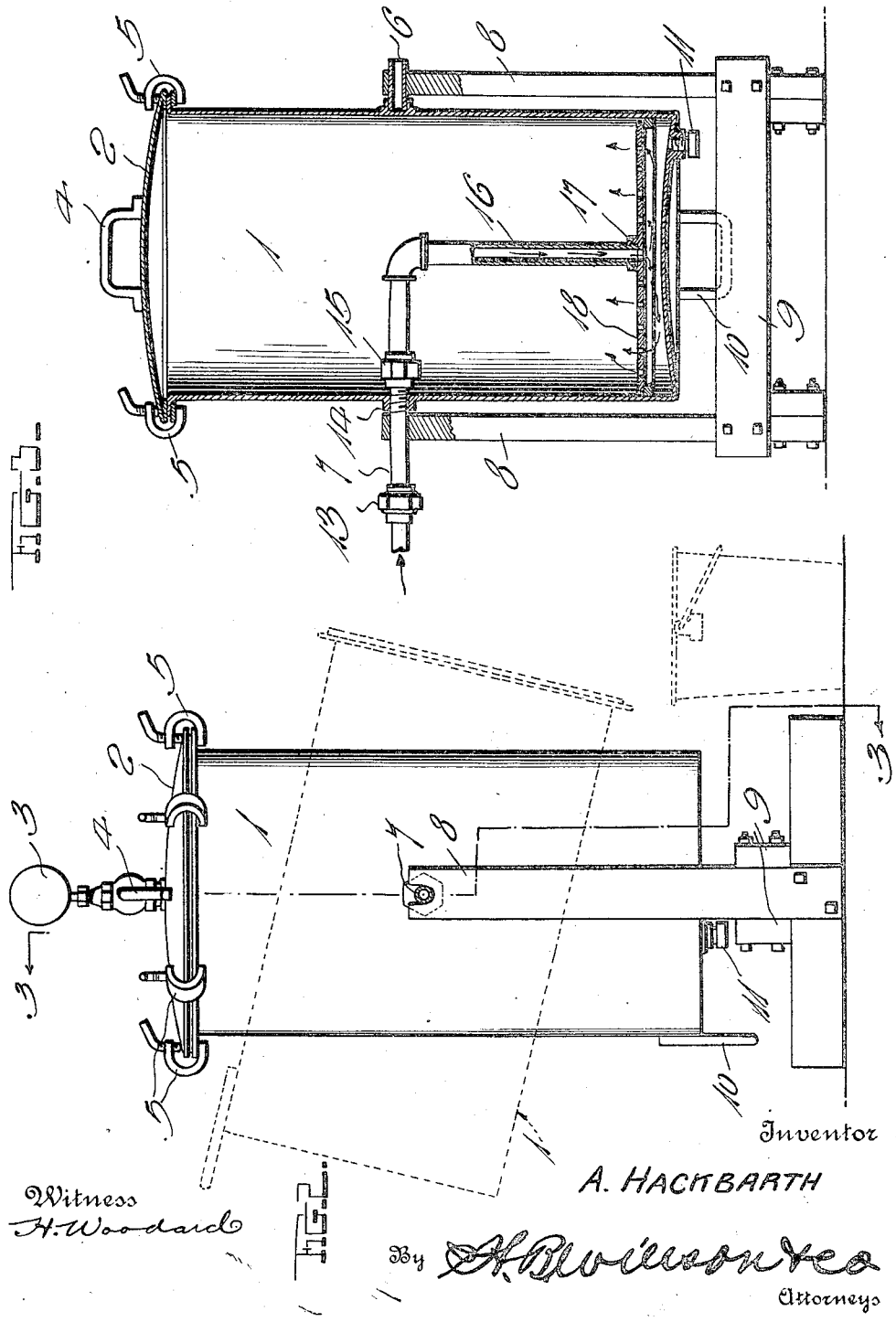

1,481,193

UNITED STATES PATENT OFFICE.

AMEL HACKBARTH, OF ZION, ILLINOIS.

FOOD COOKER.

Application filed November 6, 1922. Serial No. 599,479.

*To all whom it may concern:*

Be it known that I, AMEL HACKBARTH, a citizen of the United States, residing at Zion, in the county of Lake and State of Illinois, have invented certain new and useful Improvements in Food Cookers; and I do declare the following to be a full, clear, and exact description of the invention, such as will enable others skilled in the art to which it appertains to make and use the same.

My invention relates to improvements in steam cookers and the present disclosure is intended primarily for use as a stock food cooker.

The principal object of the invention is to provide a cooking receptacle which may be tilted to discharge its contents and to provide a steam supply pipe for said receptacle acting as a pivotal support for said receptacle about which the latter is tilted.

A further aim is to provide novel means for uniformly distributing the steam to the contents of the receptacle.

With the foregoing in view, the invention resides in the novel subject matter hereinafter described and claimed, the description being supplemented by the accompanying drawings.

Figure 1 is a side elevation of the steam cooker connected with a suitable boiler for supplying the steam.

Figure 2 is a side elevation of the cooker looking in a direction at right angles to Figure 1.

Figure 3 is a sectional view as indicated by line 3—3 of Figure 2.

In the drawings above briefly described, the numeral 1 designates a heating receptacle which is preferably in the form of a vertically disposed cylinder having a suitable top 2 provided with an appropriate blow-off valve 3, a handle 4, and any desired means 5 for clamping said top to the receptacle 1 in a steam tight manner.

In the present showing, one side of the tank 1 is provided with a fixed outwardly extending trunnion 6, while a steam supply pipe 7 enters the opposite side of said tank in axial alignment with said trunnion, said pipe 7 and the trunnion 6 being supported by suitable standards 8 rising from a base 9, whereby they act to pivotally support the entire receptacle, so that it may be tilted to the dotted line position shown in Fig. 2, for the purpose of discharging the cooked contents. To facilitate the dumping operation, the lower end of the tank or receptacle 1 is preferably provided with a handle 10 and I also prefer that the bottom of said receptacle shall have a suitable drain plug 11.

In the preferred form of construction, the pipe 7 extends from a suitable boiler 12 and consists of several suitably connected sections, two of which are relatively rotatable and connected by a union 13. One of these sections passes through the receptacle wall and is preferably threaded through a boss 14 which may well be formed by outwardly stamping a portion of said wall. Another union 15 is provided on the pipe line 7, at the inner side of the receptacle wall to facilitate connection thereof with the downwardly extending inner terminal 16 of said pipe line. This terminal 16 is suitably connected at 17 with a false perforated bottom 18 mounted in the receptacle 1. It will be seen that steam passing through the pipe line 7 will be discharged in the space between the false and true bottoms of the receptacle and that this steam will be forced upwardly in jets through the perforations of the false bottom 18, thereby equally distributing the steam through the contents to be cooked.

After the cooking operation is completed, the cover 2 may be removed and the entire receptacle 1 tilted to the dotted line position shown in Fig. 2, in order that its contents may be dumped. The device is extremely simple and inexpensive, yet will be highly efficient and desirable, and since excellent results may be obtained from the details disclosed, these details are preferably followed. However, it will be understood that within the scope of the invention as claimed, numerous minor changes may be made.

I claim:

A steam cooker comprising a cooking receptacle having a false perforated bottom therein spaced above its main bottom, a trunnion extending from one side of said receptacle, a steam supply pipe extending through the other side of the receptacle in axial alinement with said trunnion, the inner end of said pipe being turned downwardly into the receptacle and connected with the false bottom to supply steam to the space between the latter and said main bottom, said pipe having sections connected by unions to permit relative turning of said sections to permit tilting of the receptacle, and a supporting frame with which said trunnion and one section of said pipe are rockably engaged to jointly support said receptacle and permit tilting thereof for discharging its contents.

In testimony whereof I have hereunto affixed my signature.

AMEL HACKBARTH.